UNITED STATES PATENT OFFICE.

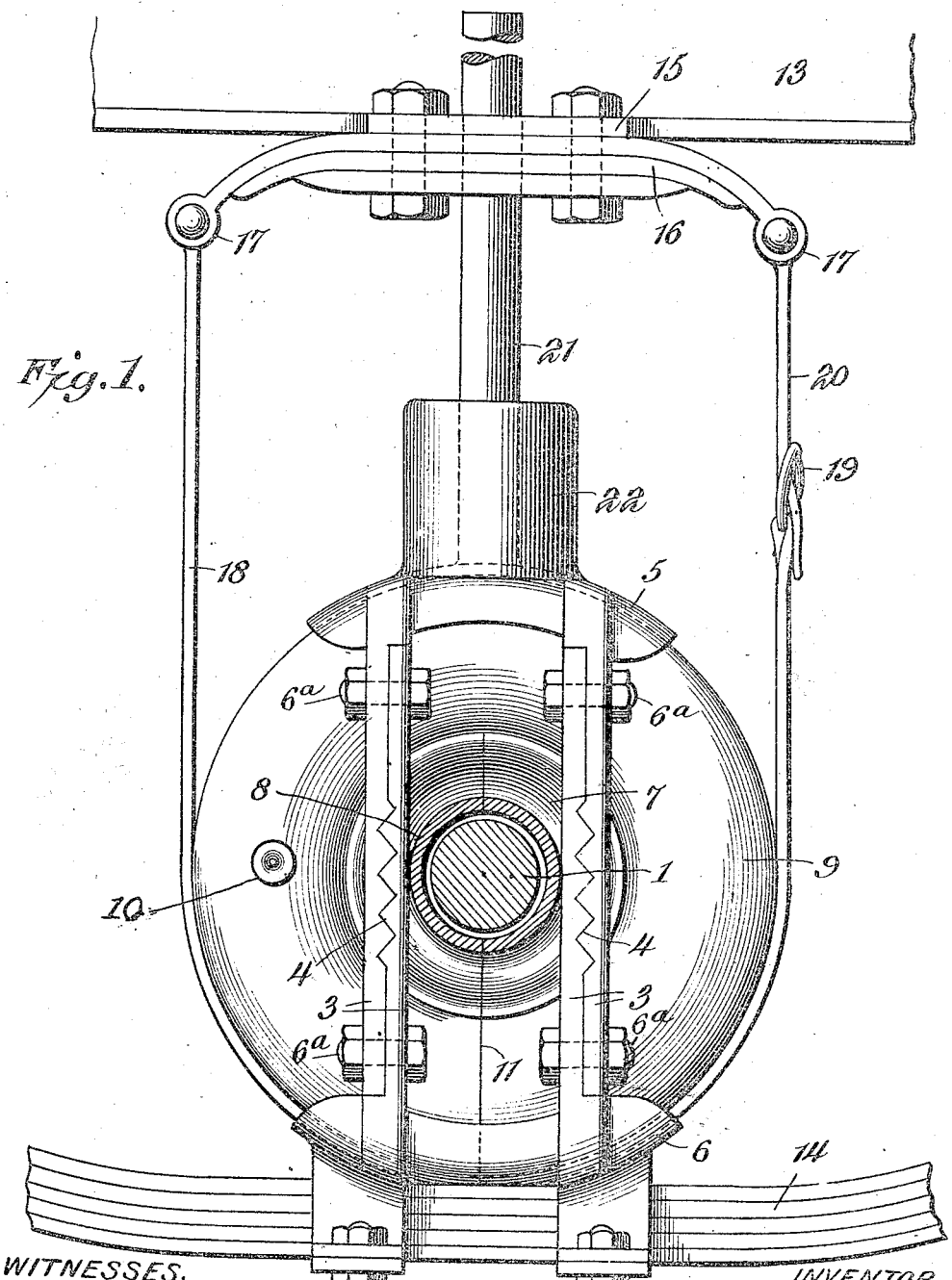

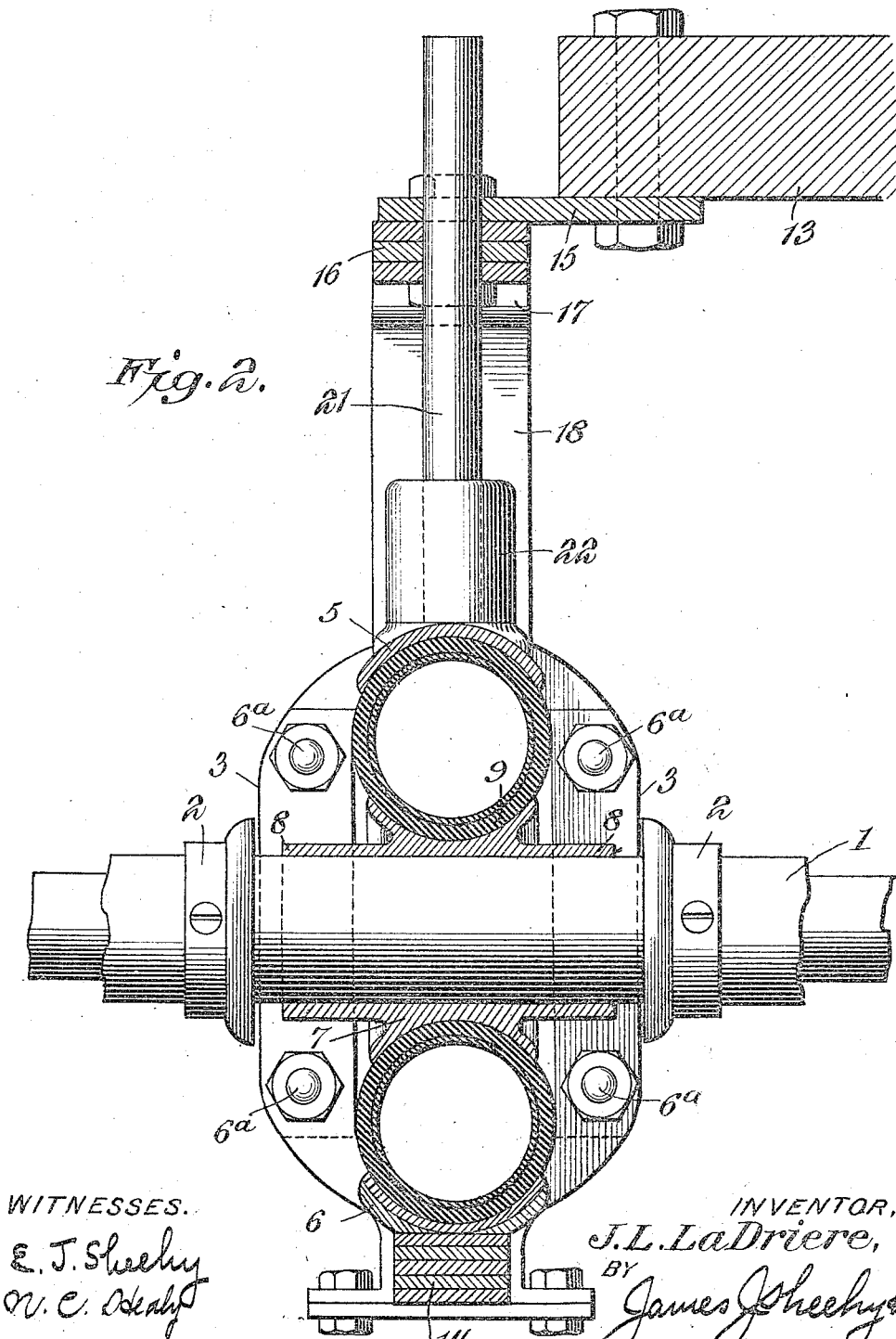

JOSEPH L. LA DRIERE, OF ALBUQUERQUE, NEW MEXICO.

CUSHIONING MEANS FOR VEHICLES.

1,054,569.

Specification of Letters Patent. Patented Feb. 25, 1913.

Application filed July 24, 1912. Serial No. 711,261.

*To all whom it may concern:*

Be it known that I, JOSEPH L. LA DRIERE, citizen of the United States, residing at Albuquerque, in the county of Bernalillo and State of New Mexico, have invented new and useful Improvements in Cushioning Means for Vehicles, of which the following is a specification.

My present invention pertains to means for absorbing shock and preventing the transmission of shock and jar to the bodies of cars, automobiles and other vehicles.

The object of the invention is to provide a compact and highly efficient device embodying a pneumatic tire or other annular cushion surrounding the axle of the vehicle and interposed between an elliptic spring and the body and connected through yielding means with the body so as to efficiently cushion and at the same time preclude undue recoil of the body.

Other advantageous characteristics of the invention will be fully understood from the following description and claims when the same are read in connection with the drawings, accompanying and forming part of this specification, in which:

Figure 1 is a side elevation of the pneumatic axle and shock absorber constituting the best practical embodiment of my invention that I have as yet devised. Fig. 2 is a view, partly in vertical section and partly in elevation, taken at a right angle to Fig. 1.

Similar reference numerals designate corresponding parts in both views of the drawings.

In furtherance of my invention I arrange on the axle 1 of a vehicle, two spaced collars 2, and between the said collars I arrange guides 3. Each of the said guides is preferably, though not necessarily, made up of lapped bars, Fig. 1, having opposed toothed faces as indicated by 4. One set of the bars, four in number, are fixed to and depend from a rest 5, and the other set of bars, also four in number, are fixed to and extend upward from a cradle 6. It will also be noticed that the opposed bars are connected together through the medium of bolts 6ª.

Surrounding the axle 1 and having a circumferential groove is a collar 7, and the said collar is equipped with tubular portions 8 each of which is disposed between and free to move up and down between a pair of guides. Surrounding the collar 7 and seated in the said circumferential groove thereof is a cushioning annulus 9 which is preferably in the form of a pneumatic tube equipped with an inflation tube 10. It will be noticed here that the collar 7 comprises two semi-circular sections having their ends opposed as shown in Fig. 1; also, that in placing the tire in position it is cut at the point 11 and afterward sealed, or else the tire has closed ends opposed at the point 11.

While I prefer to employ a cushioning annulus in the form of a pneumatic or inflatable tire, I do not desire to be understood as confining myself to said construction, inasmuch as a cushioning annulus of solid rubber or other suitable resilient material may be employed without involving departure from the scope of my invention.

Disposed under the cradle 6 and connected with the same and also with the guides 3, is an elliptic spring made up of leaves and designed at its ends to be curved upward and connected in conventional manner (not shown), with the body of the vehicle, indicated by 13. The said elliptic spring is numbered 14, and is best shown in Fig. 1.

Fixed to and extending outward from the body of the vehicle is a bar 15, and connected to the underside of the said bar 15 is a leaf spring 16 which has its ends extended beyond the bar, as best shown in Fig. 1 and terminating in knuckles 17. To one of the said knuckles is connected one end of a strap 18, preferably of leather, which strap is passed around the tire 9 and interposed between the same and the cradle 6, and then carried upward to a point adjacent the other knuckle, where it is provided with a buckle 19. A second strap 20 is engaged with said buckle in conventional manner and is connected at its upper end with such other knuckle. The connection of the straps 18 and 20 through the medium of the buckle 19 permits of the device being adjusted to regulate its tension.

A rod 21 is connected to the rest 5, and is carried upward through coincident apertures in the bar 15 and the leaves of the spring 16. By virtue of this arrangement the body 13 is held against lateral movement.

A bumper 22, of rubber or other resilient material, is arranged on the rest 5 and around the rod 21. The said bumper serves in the event of extraordinary jolting to adequately cushion the body.

It will be manifest from the foregoing that the spring 14 hung under the axle and connected to the tire-holding frame, serves to pull downward and thereby place the weight on the portion of the cushioning annulus 9 that is between the axle 1 and the body 13. It will also be manifest that the strap, the spring 16 and the cushioning annulus constitute a highly efficient recoil or shock absorber; and it will further be observed that by reason of the cushioning annulus surrounding the axle it will operate both ways in reducing to a minimum the transmission of shock and jar to the body, and in assuring easy riding of the persons in the latter.

Having described my invention, what I claim and desire to secure by Letters-Patent, is:

1. In a vehicle, the combination of an axle, a body, a frame, a cushioning annulus surrounding the axle and disposed in the frame, an underhung spring connected to the frame whereby it is enabled to pull down on the top of said annulus, and a strap having its ends connected with the body and also having a bight disposed under and receiving the lower portion of the annulus, whereby the annulus is enabled to cushion upward movements of the body.

2. In a vehicle, the combination of an axle, a body, a frame, a collar surrounding the axle and movable in said frame, a cushioning annulus surrounding the collar and disposed in the frame, an underhung spring connected to the frame whereby it is enabled to pull down on the top of said annulus, and a strap having its ends connected with the body and also having a bight disposed under and receiving the lower portion of the annulus.

3. In a vehicle, the combination of an axle, a body, a spring connected with the body and having extended end portions, a frame, a collar surrounding the axle and movable in said frame, a cushioning annulus surrounding the axle and disposed in the frame, an underhung spring connected to the frame whereby it is enabled to pull down on the top of said annulus, and a strap having a bight disposed under and receiving the lower portion of the annulus and also having its ends connected to the extended end portions of the first-named spring.

4. In a vehicle, the combination of an axle, a body having a laterally extending apertured plate, a frame, a collar surrounding the axle and movable in said frame, a cushioning annulus surrounding the axle and disposed in the frame, an underhung spring connected to the frame whereby it is adapted to pull down on the top of the annulus, a spring connected to the laterally extending apertured plate on the body and having extended end portions and also having apertures coincident with that of said plate, a strap having a bight receiving the lower portion of the annulus and also having end portions connected to the extended ends of the second-named spring, a rod connected to and extending upward from the frame and through the said apertures of the plate and spring, and a resilient bumper surrounding the rod and superposed on the frame.

5. In a vehicle, the combination of a body having an apertured portion, an axle, a cushioning annulus surrounding the axle, an underhung spring, a frame connected with said spring and receiving the axle and annulus, and a rod carried by and extending upward from said frame and loosely through the said apertured portion of the body.

6. In a vehicle, the combination of a body, a spring connected therewith and having extended end portions, an axle, a cushioning annulus surrounding the axle, and a strap having a bight receiving the lower portion of the cushioning annulus; the said strap being connected at its ends to the said extended ends of the spring.

In testimony whereof I have hereunto set my hand in presence of two subscribing witnesses.

JOSEPH L. LA DRIERE.

Witnesses:
W. C. KEIM,
IDA M. PARKE.